May 10, 1938.　　　　M. A. LUCE　　　　2,116,525
MOTOR-RAIL VEHICLE
Filed Feb. 12, 1936　　　12 Sheets-Sheet 1
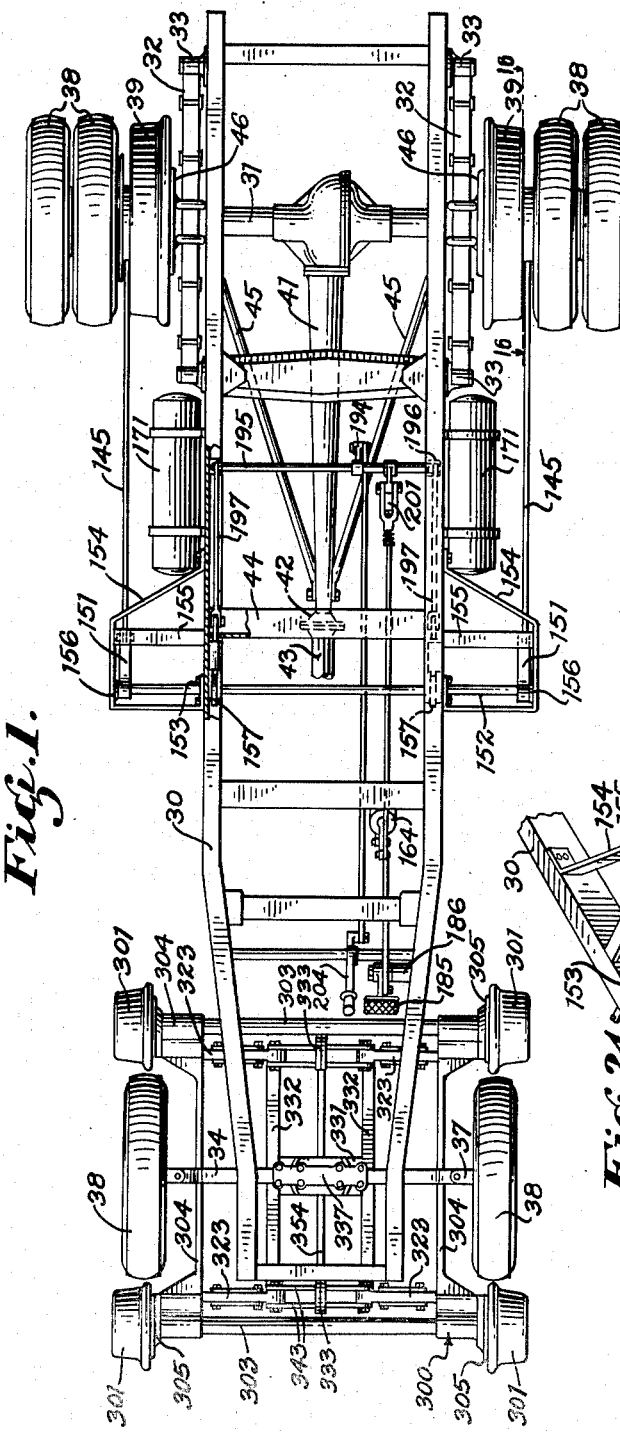
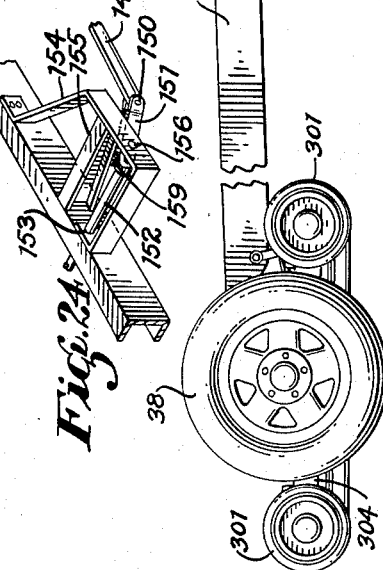
INVENTOR.
MILTON A. LUCE
BY
ATTORNEY May 10, 1938.  M. A. LUCE  2,116,525
MOTOR-RAIL VEHICLE
Filed Feb. 12, 1936   12 Sheets-Sheet 2
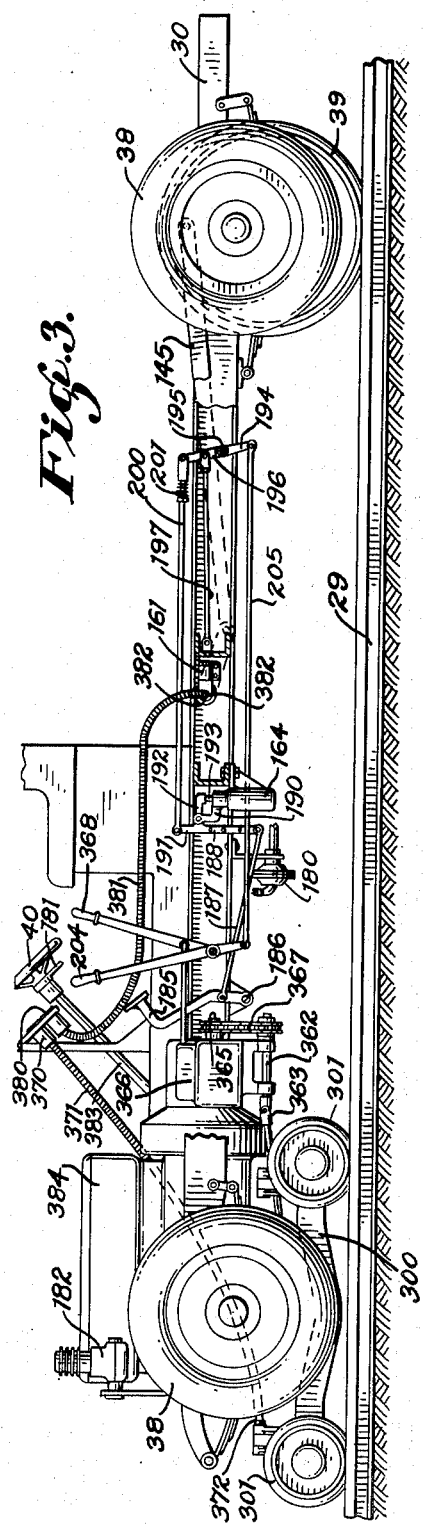
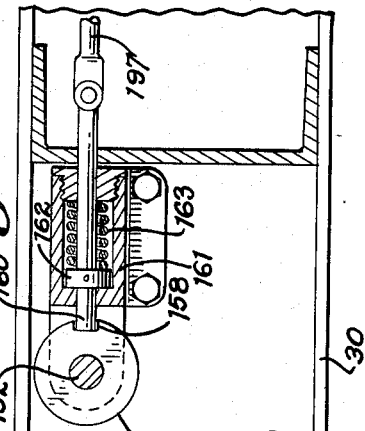
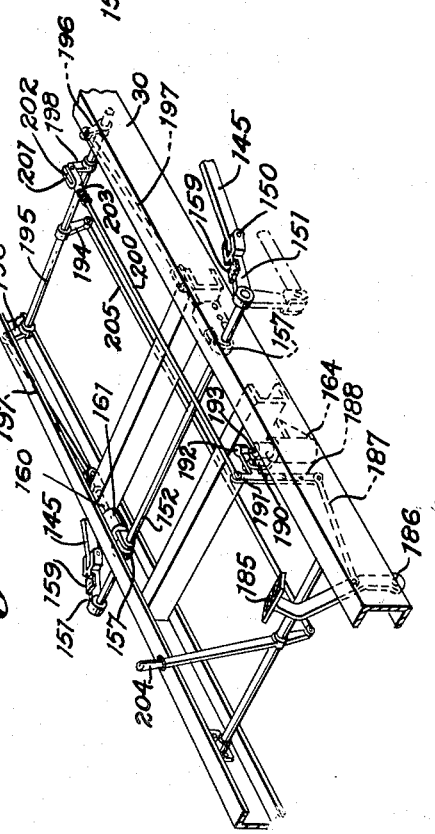
INVENTOR.
MILTON A. LUCE
BY
ATTORNEY

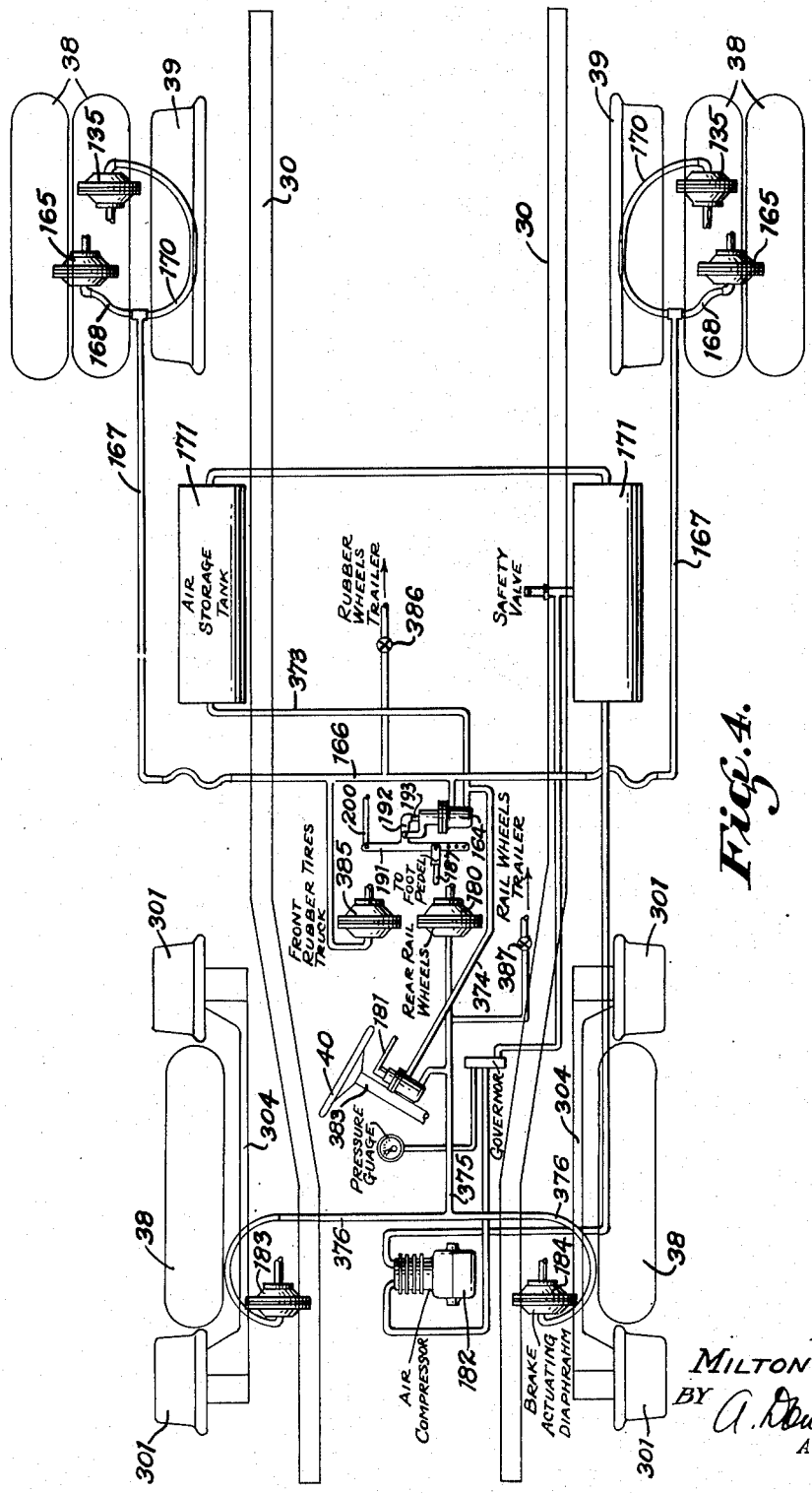

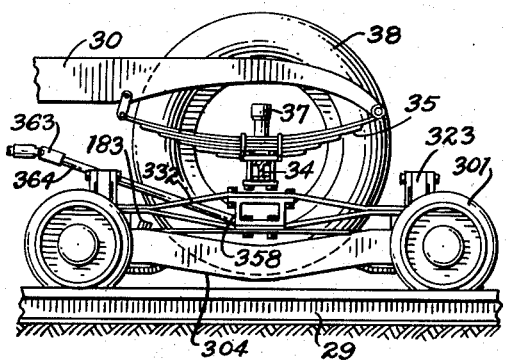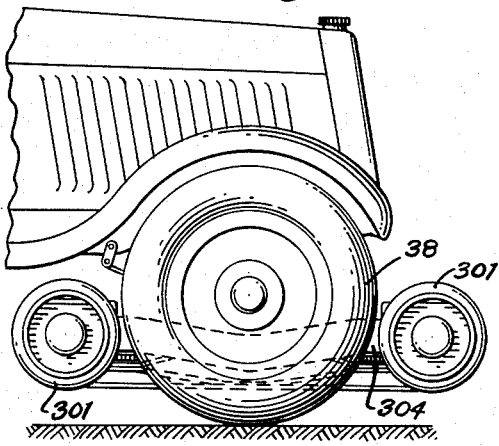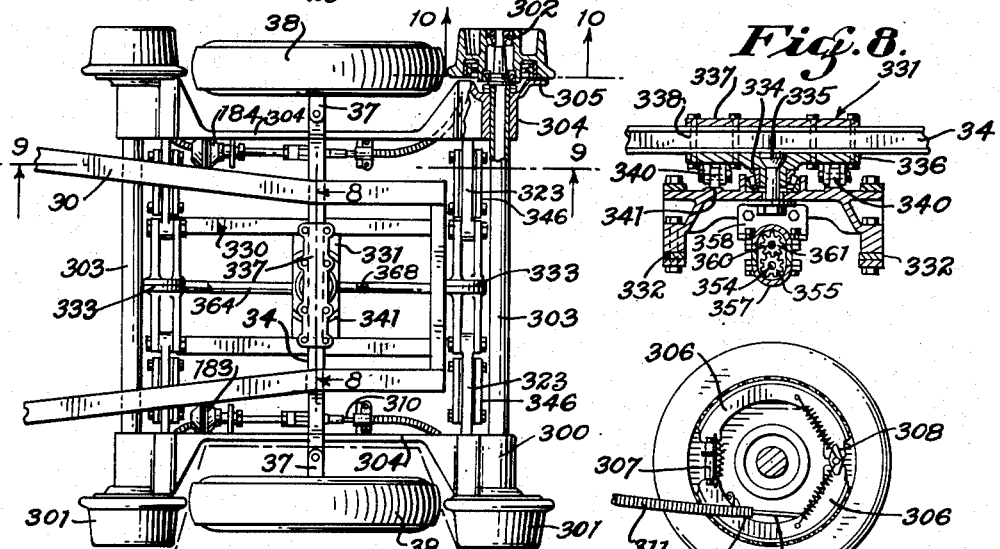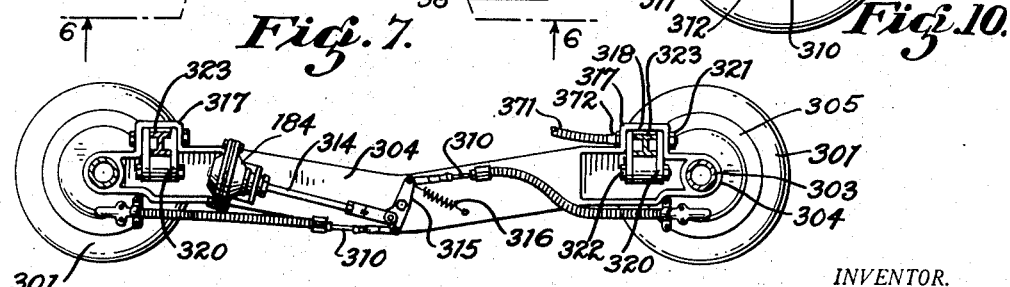

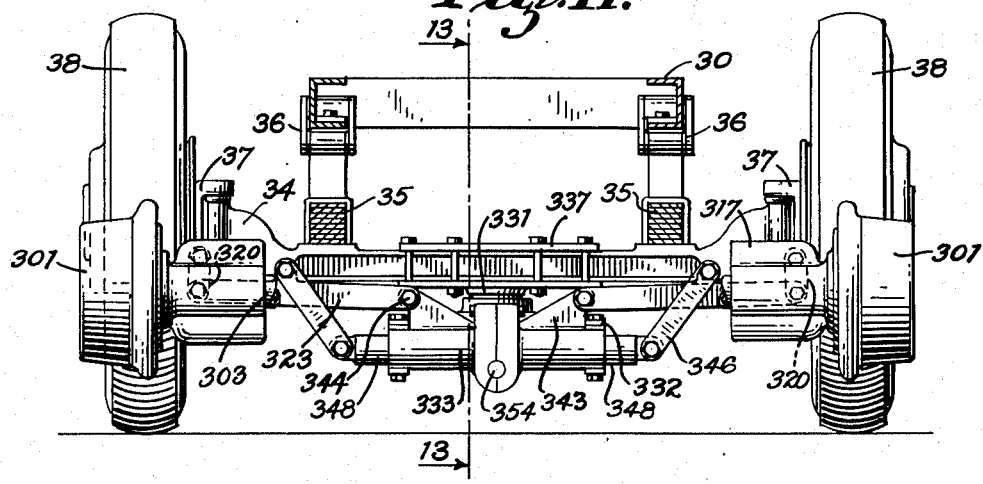
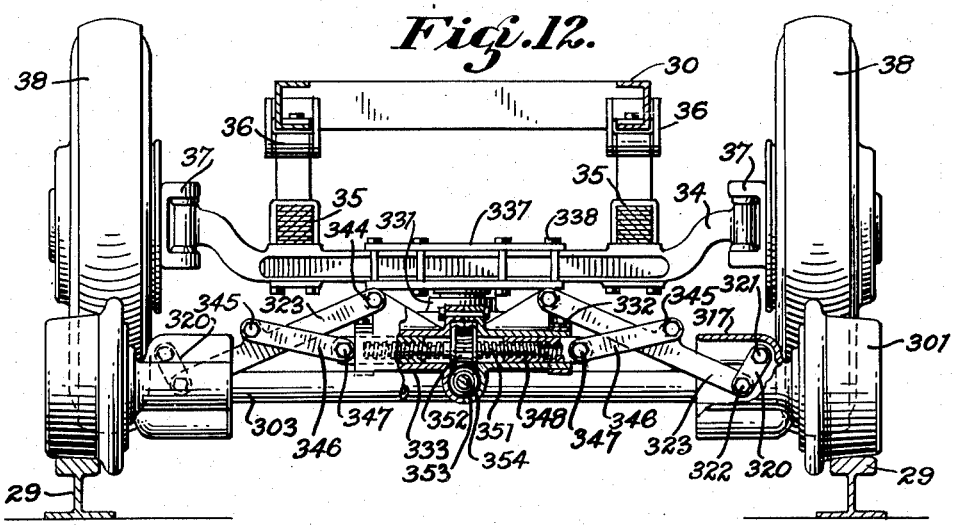
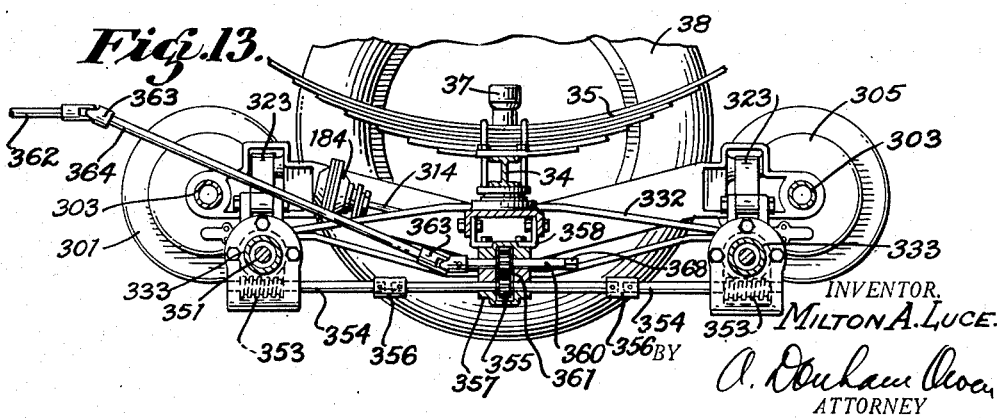

May 10, 1938.  M. A. LUCE  2,116,525
MOTOR-RAIL VEHICLE
Filed Feb. 12, 1936   12 Sheets-Sheet 6

INVENTOR.
MILTON A. LUCE
BY
ATTORNEY

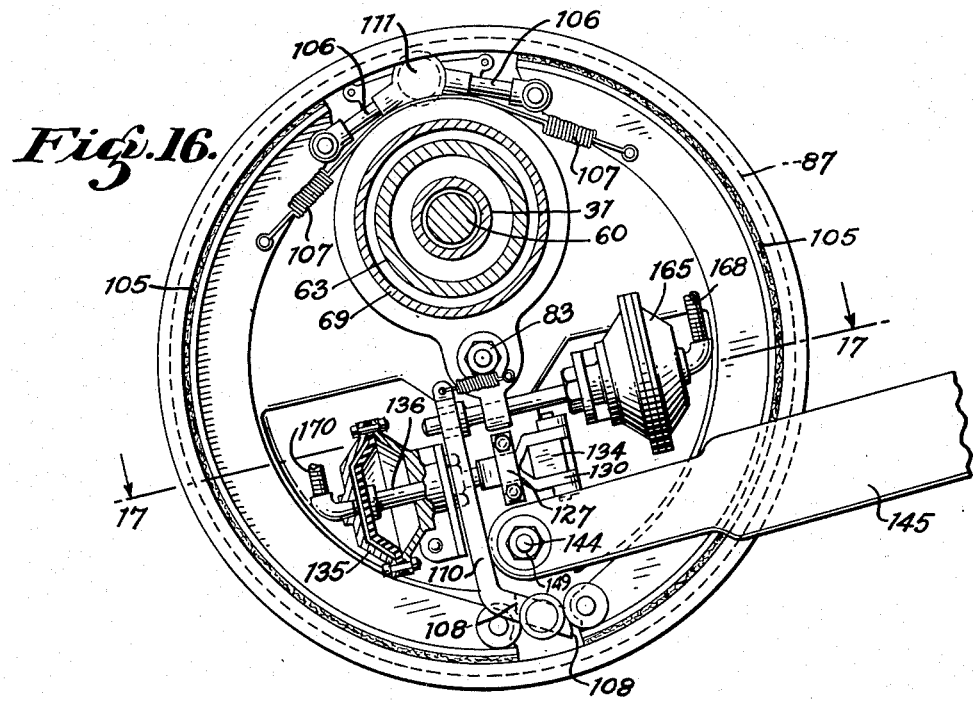
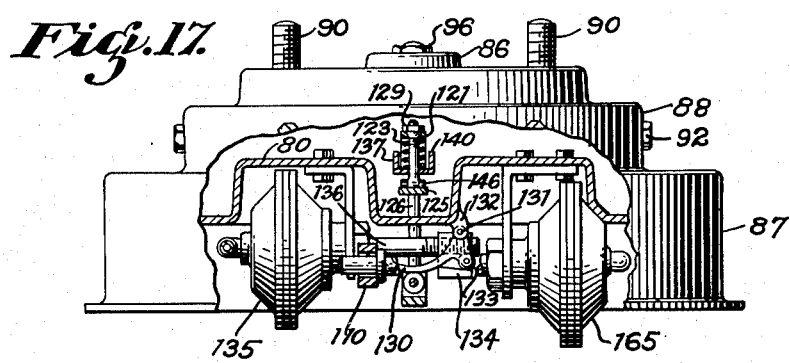
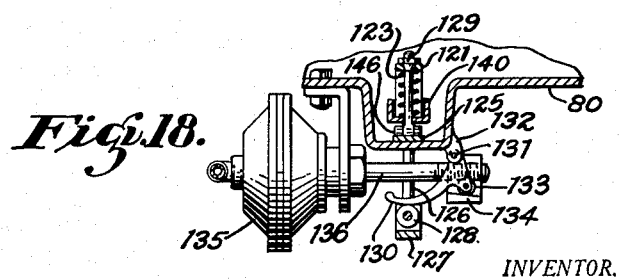

May 10, 1938.   M. A. LUCE   2,116,525
MOTOR-RAIL VEHICLE
Filed Feb. 12, 1936     12 Sheets-Sheet 8

INVENTOR.
MILTON A. LUCE
BY
ATTORNEY

May 10, 1938.  M. A. LUCE  2,116,525
MOTOR-RAIL VEHICLE
Filed Feb. 12, 1936   12 Sheets-Sheet 9

INVENTOR.
MILTON A. LUCE
BY
ATTORNEY

May 10, 1938.  M. A. LUCE  2,116,525
MOTOR-RAIL VEHICLE
Filed Feb. 12, 1936    12 Sheets-Sheet 10

INVENTOR.
MILTON A. LUCE
BY
A. Dunham Owen
ATTORNEY

May 10, 1938.　　　M. A. LUCE　　　2,116,525
MOTOR-RAIL VEHICLE
Filed Feb. 12, 1936　　　12 Sheets-Sheet 11

INVENTOR.
MILTON A. LUCE
BY
ATTORNEY

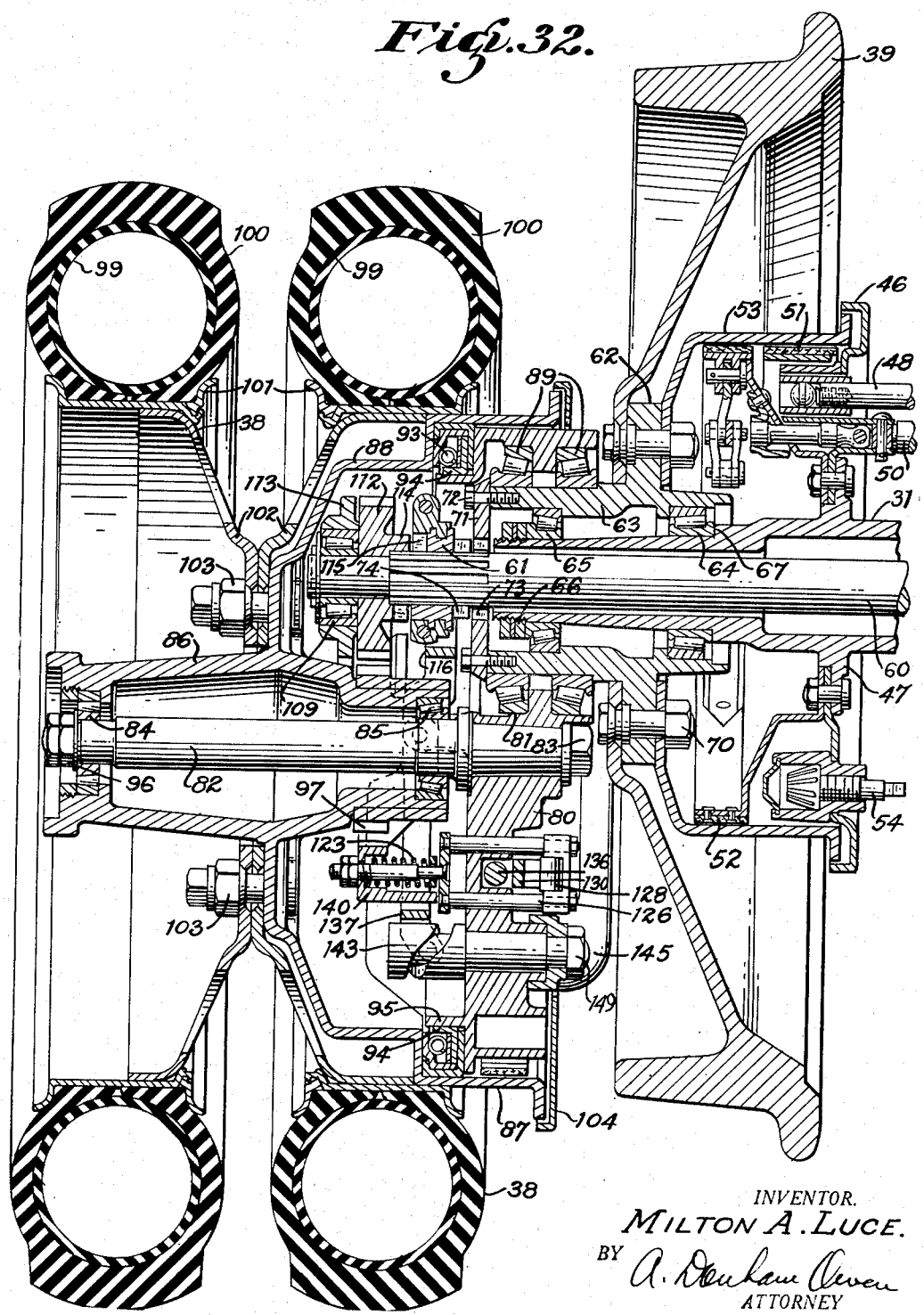

Patented May 10, 1938

2,116,525

UNITED STATES PATENT OFFICE 2,116,525

MOTOR-RAIL VEHICLE

Milton A. Luce, San Francisco, Calif.

Application February 12, 1936, Serial No. 63,598

19 Claims. (Cl. 105—215)

My invention relates to roadrail vehicles and particularly to the type of vehicle adapted for operation on smooth road beds and track road beds.

The broad object of my invention is to provide a roadrail vehicle which can be used on one or the other type of road bed and in which the change from road to rail operation can be effected by the driver without the necessity of his getting out of the vehicle cab and without requiring any other assistance, and by means which are controlled entirely from within the reach of the operator.

One object of my invention is to provide a rail unit adapted for attachment to a conventional road motor truck, as an accessory, converting it into a roadrail vehicle.

Another object of my invention is to provide a roadrail vehicle in which the drive to the road wheels and to the rail wheels is through the same differential and axle.

Another object of my invention is to provide a roadrail unit with the road wheels out of contact with the rails during rail operation, and vice versa during operation of the vehicle on the road.

Another object of my invention is to provide positive means for locking the device in the rail or road position.

Another object of my invention is to provide a cam control for positive locking of the parts in the rail position and in the road position.

Another object of my invention is to provide means for using the rear road brake of the vehicle as a locking mechanism or clutch to effect the swinging of the wheel shifting mechanism and also to use them as the brake means when in the shifted position.

Another object of my invention is to provide a roadrail vehicle in which the shift from the rail to the road position and vice versa is accomplished by the rotation of one axle about the other.

Another object of my invention is to provide for the eccentric mounting of one drive axle about the other drive axle.

Another object of my invention is to provide a roadrail vehicle having the shifting and operating mechanism mounted within the housing of the wheel being shifted.

Another object of my invention is to provide a roadrail vehicle having means for accomplishing an adjustment of the relative gear ratios between the motor and the road wheels, and the motor and the rail wheels.

Another object of my invention is to provide a roadrail vehicle having a gear drive to the road wheel, and having the rail wheels mounted on the driving axle extending from the differential.

Another object of my invention is to provide a roadrail vehicle having a yieldable engagement of the gear shifting means when changing from the road to the rail drive position and vice versa.

Another object of my invention is to provide means attached to the roadrail unit to assure proper positioning and guiding of the part during the shifting operation.

Another object of the invention is to provide means for positively limiting the rotation of the unit in shifting from the road to the rail position and vice versa.

Another object of my invention is to provide a front rail truck which fits onto the front axle of the vehicle and will turn to clear the road wheel and likewise permit the steering road wheel a full turning radius when the rail wheel unit is retracted.

Other objects of my invention will appear from the description which is to follow.

In the accompanying drawings forming a part of this specification and in which like numerals are employed to designate like parts throughout the same:

Fig. 1 is a plan view of the roadrail vehicle with the body, engine and parts of the control mechanism omitted;

Fig. 2 is the device of Fig. 1 in side elevation, showing the road wheels in operative position;

Fig. 3 is a side elevation showing the rail wheels in operative position;

Fig. 4 is a plan view, with certain parts omitted but showing the control pipes and part of the control valve actuating mechanism;

Fig. 5 is a side elevation of the front end showing the road wheels in operative position;

Fig. 6 is a side elevation of the front end on the line 6—6 of Fig. 7 showing the rail wheels in operative position;

Fig. 7 is a top plan view partly in cross section, of the front end with the engine, hood, etc. omitted;

Fig. 8 is a cross section on the line 8—8 of Fig. 7;

Fig. 9 is a cross section on the line 9—9 of Fig. 7, showing the rail unit frame only;

Fig. 10 is a cross section on the line 10—10 of Fig. 7;

Fig. 11 is a front end elevation partly in section, showing the road wheels in operative position;

Fig. 12 is a front end elevation partly in section showing the rail wheels in operative position;

Fig. 13 is a side elevation partly in section, taken on the line 13—13 of Fig. 11;

Fig. 16 is a side elevation, partly in cross section, taken on the line 16—16 of Fig. 1 and with other parts omitted to show the wheel shifting mechanism;

Fig. 17 is a view partly in cross section taken along the line 17—17 of Fig. 16;

Fig. 18 is a detailed view of the shifting mechanism shown in Fig. 17;

Fig. 24 is a perspective view of the side frame member where the radius rod is connected;

Fig. 25 is a cross section of the radius rod locking means mounted in the frame;

Fig. 29 is a view in perspective showing the brake lever hook-up to the shift control valve;

Fig. 32 is a cross section on the line 32—32 of Fig. 30.

Figure 14:
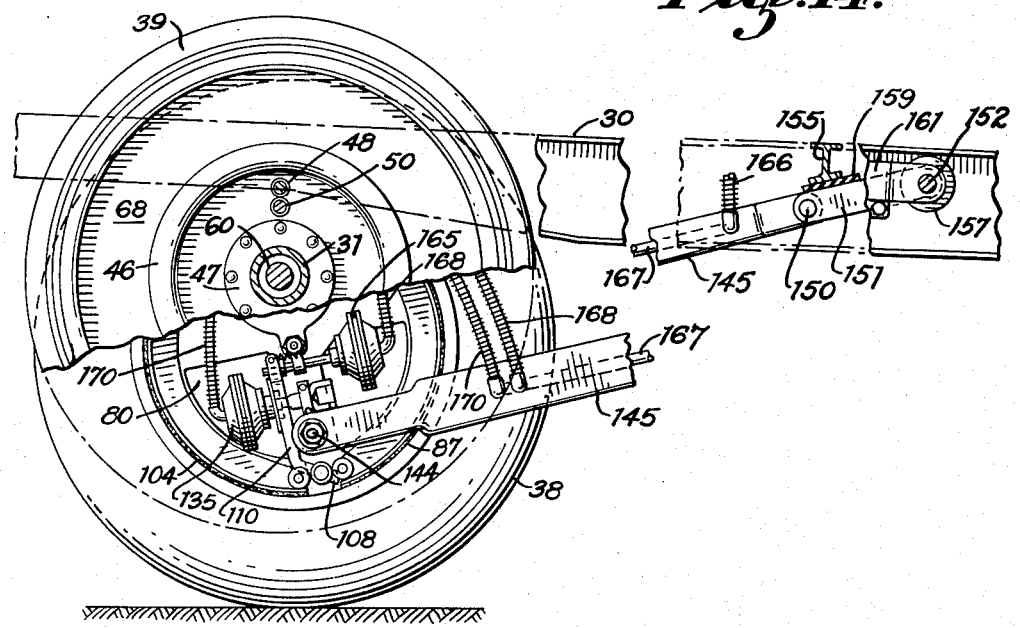
Fig. 14 is a side elevation of the left rear wheels and frame section partially in cross section and with the rail wheel partly broken away to show the road wheel and related parts.

As stated, the object of my invention is to provide a practical operative road rail unit which can be attached to an existing motor truck as an accessory. Obviously, it can be built into the truck as original equipment where desired.

In general the device comprises the usual motor truck with a frame 30 having a rear axle housing 31 carried by springs 32 shackled to the frame at 33, and a front axle 34 likewise attached to a spring 35 which is shackled to the frame at 36. On the ends of the front axle 34 are the usual steering knuckles 37 providing spindles for the front steering wheels 38. These wheels are guided by means of the steering mechanism 40 and the conventional linkage (not shown).

*The rear end*

The rear axle has attached to it the drive tube 41 having a universal connection 42 with the short drive tube 43 mounted rigidly in the frame cross member 44. The rods 45 brace the drive tube 41 and the axle housing 31. Thus far, the parts described are the conventional units of a motor truck.

Figure 19:
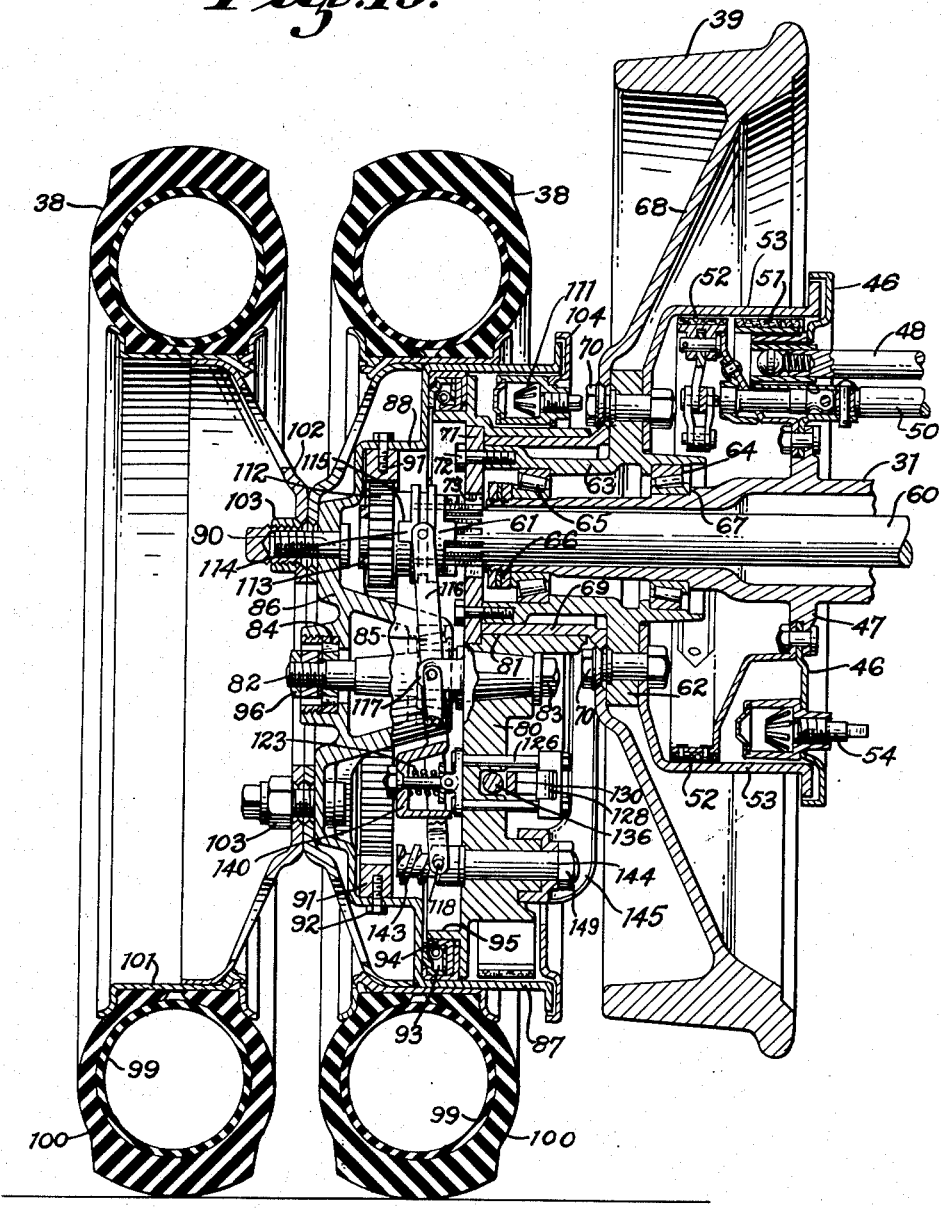
Fig. 19 is a cross section on the line 19—19 of Fig. 2.
Figure 21:
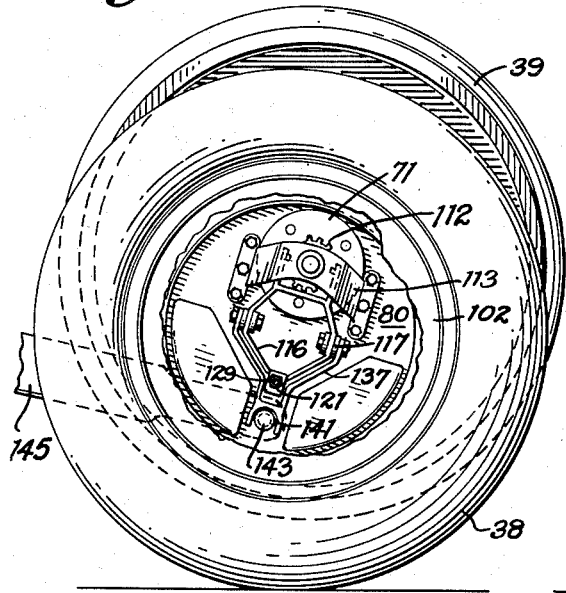
Fig. 21 is a side elevation of the wheel in Fig. 20, partly broken away to show the shifting mechanism.

In Fig. 19 is shown in cross section, the unit I add to each end of the rear axle housing 31. Certain parts are conventional, such as the brake anchor and dust plate 46 riveted to flange 47 on housing 31. In this plate are mounted the brake actuating levers 48 and 50, adapted through suitable linkage to press the brake bands 51, and 52, respectively, against the brake drum 53. 54 is the conventional brake adjustment cam, and is carried by the dust plate 46.

The axle 60 extends out through the end of housing 31 and has splined on its outer end, a clutch dog 61. The axle 60 I have illustrated is of the full-floating type and at its inner end (not shown) it projects into one side of the differential mechanism (not shown). It is through this axle 60 that the driving torque is carried to both the road wheel 38 and the rail wheel 39.

The rail wheel 39 is bolted to flange 62 on hub 63. This same flange also carries the brake drum 53. The hub 63 is mounted on roller bearings 64 and 65 which are in turn supported on the end of the axle housing 31. A retaining nut 66 holds the outer bearing 65 in position. Roller bearing 64 is retained in position by the shoulder 67. 69 represents a tubular portion overlying the hub 63 and preferably is made integral with the rail wheel webbing 68. The outer surface of the tubular member 67 serves as a bearing member for purposes that will subsequently be described. In addition to the bolts 70 that hold the rail wheel to the flange 62 I provide a retainer plate 71 rigidly secured over the end of the hub 63 by the cap screws 72.

The retainer plate 71 has an opening in the center provided with notches 73. At the outer edge it extends beyond the hub 63 and serves to hold the tubular member 69 in position.

It also has an additional function which will be described subsequently.

When driving through the axle 60 to the rail wheel 39, power is transmitted from the clutch dog 61 splined on the axle to this retainer plate 71 and thence to the hub 63. The projections 74 on the clutch dog 61 slidably engage with the notches 73 in the retaining plate 71. Figs. 3, 15, 22 and 23, show the parts in position with the drive through the rail wheels.

The road wheels 38 are carried by the same axle housing 31 by means of the following mechanism. A spindle anchor plate 80 is provided with a bearing recess 81 which fits the tubular bearing member 69, in such a way that the anchor plate 80 can be rotated around the axle 60 and housing 31. Thus the spindle shaft 82, held in the plate 80 by nut 83, can be shifted to a position above or below the main axle shaft 60 by rotation of the plate 80. In Fig. 19 it is shown in a position below axle 60. The retaining plate 71 serves also as a retaining member to hold the anchor plate 80 on the tubular bearing member 69.

In or on the anchor plate 80 is mounted the mechanism required for driving the road wheels 38. On the spindle 82 are the roller bearings 84 and 85 which fit in the hub 86 of the road wheel 38. Integral with the hub 86 is the brake drum 87 having the stepped portion 88 and the bolts 90. In the stepped portion 88 of the drum is fitted the internal gear 91, held against rotation by the cap screws 92. Fitted in the bottom of the brake drum portion 87 is an oil retainer 93 having a leather flange 94 spring pressed against a flange 75

96 on the anchor plate 80. This grease retainer serves to confine the grease contained in the housing formed by the anchor plate 80 and the brake drum housing 88.

The hub 86 is retained on the spindle 82 by means of the usual nut 96.

The road wheels 38 comprise the tires 100 with tubes 99, rims 101 and web portions 102, the latter being bolted to the wheel hub 86 by means of the nuts 103.

A brake anchor and dust plate 104 is suitably attached to the spindle anchor plate 80. In this plate 104 (see Fig. 16), is mounted the brake mechanism for the road wheel 38. This mechanism comprises the brake shoes 105, adjustable links 106, retraction springs 107 and actuating cams 108 carried on the lever 110. 111 is the conventional brake adjustment cam and is carried by plate 104.

Figure 30:
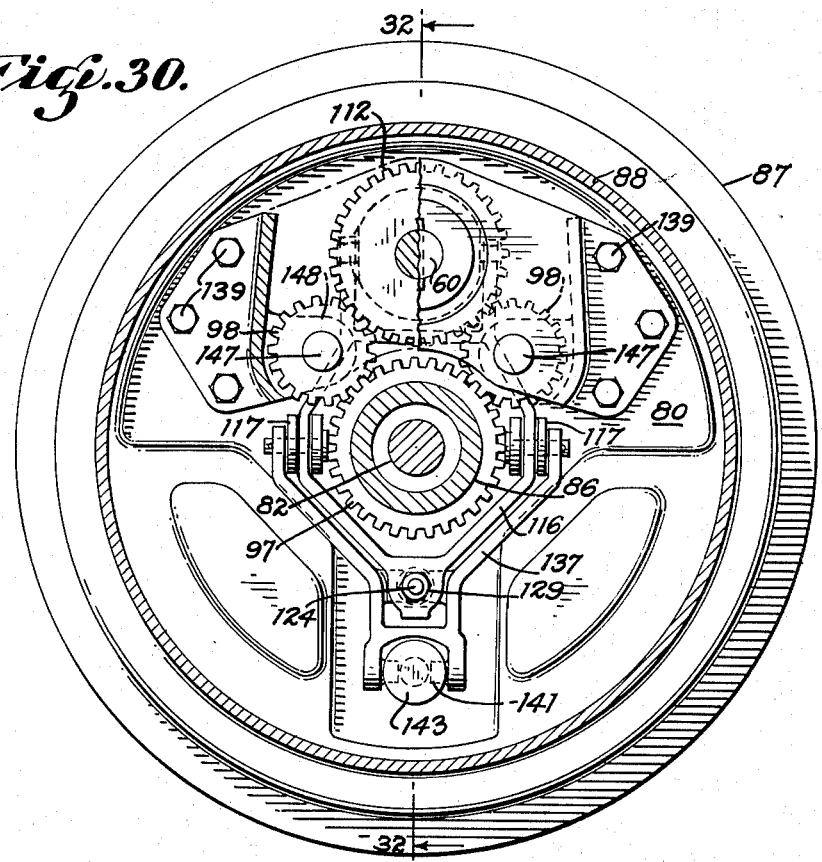
Fig. 30 is a side elevation view of a modification of the drive mechanism to the road wheel.
Figure 31:
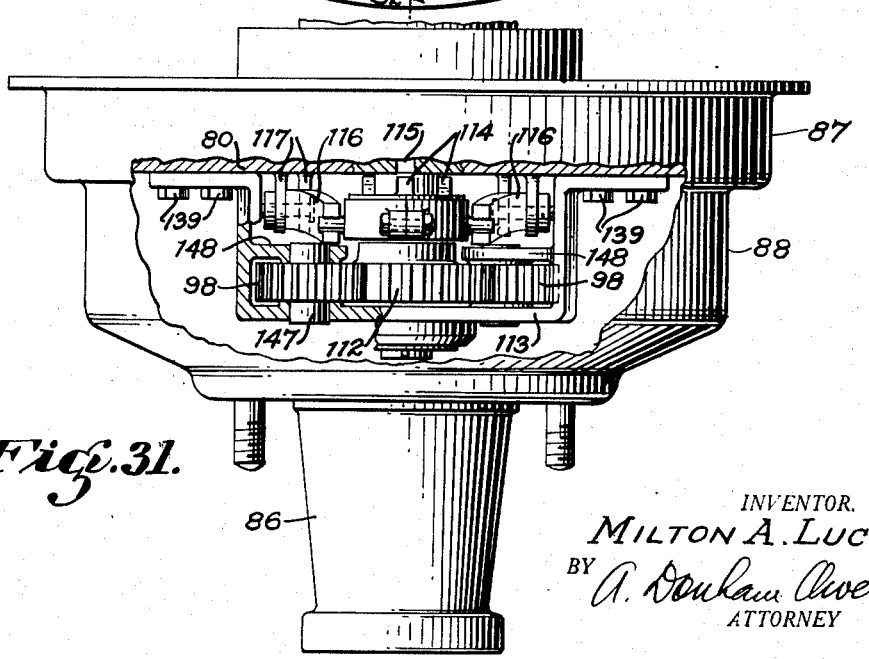
Fig. 31 is a plan view of the modification of Fig. 30 partially broken away to show the arrangement of the gears, etc.

Pinion gear 112 is loosely mounted on the outer end of axle 60, the latter being supported at its outer end in bracket 113 which is secured by cap screws 139 to anchor plate 80 (see Figs. 30, 31). The pinion 112 is in constant mesh with the internal ring gear 91. It drives the latter only when the clutch dog 61 is shifted to the left (see Fig. 19) so that the male member 114 nests in the female member 115 on the face of pinion 112. In this position the male member 74 is disengaged from the female member 73 in the retaining plate 71 so that the rail wheel will not be driven. The clutch dog 61 is arranged so that it disengages one driven member before engaging the other driven member.

Subsequently I shall describe a modification of this driving mechanism (see Figs. 30, 31 and 32) which is particularly useful where varying gear ratios between the axle 60 and the road wheel 38 are required.

Figure 20:
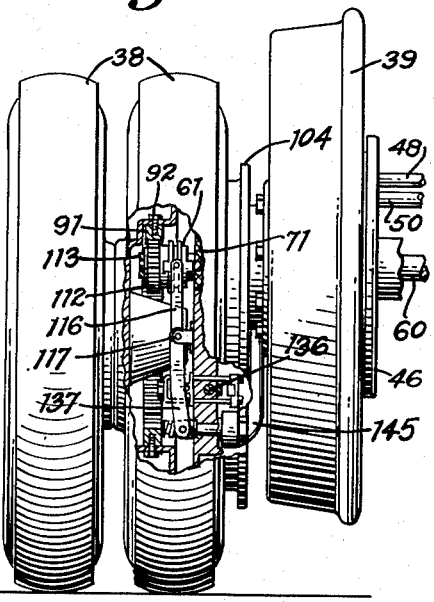
Fig. 20 is a view of the left rear wheel partly broken away, looking from the rear toward the front of the vehicle, showing the road wheel in operative position.
Figure 23:
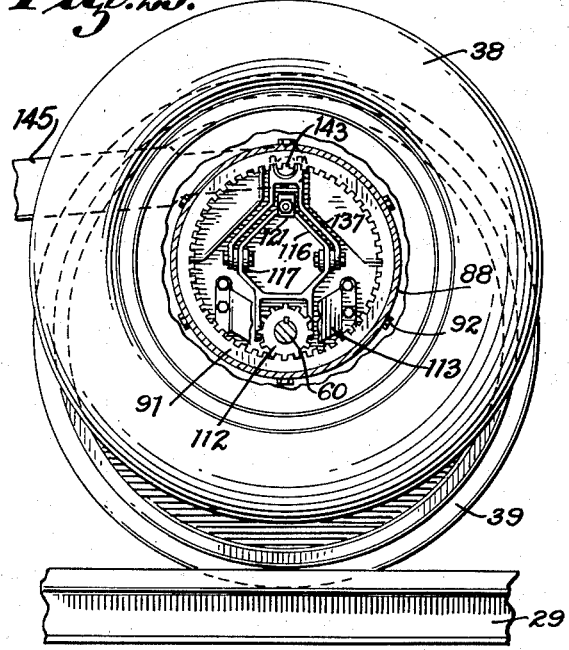
Fig. 23 is an end view of the wheel in Fig. 22 with the parts broken away to show the internal gear structure.
Figure 22:
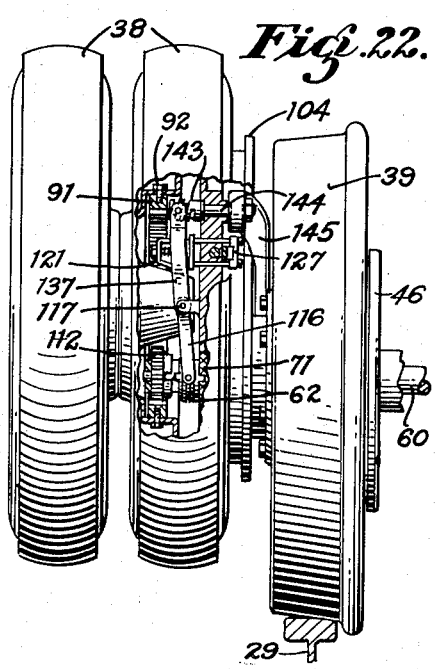
Fig. 22 is a view of the wheel shown in Fig. 20 with the parts shifted for rail operation.
Figure 26:
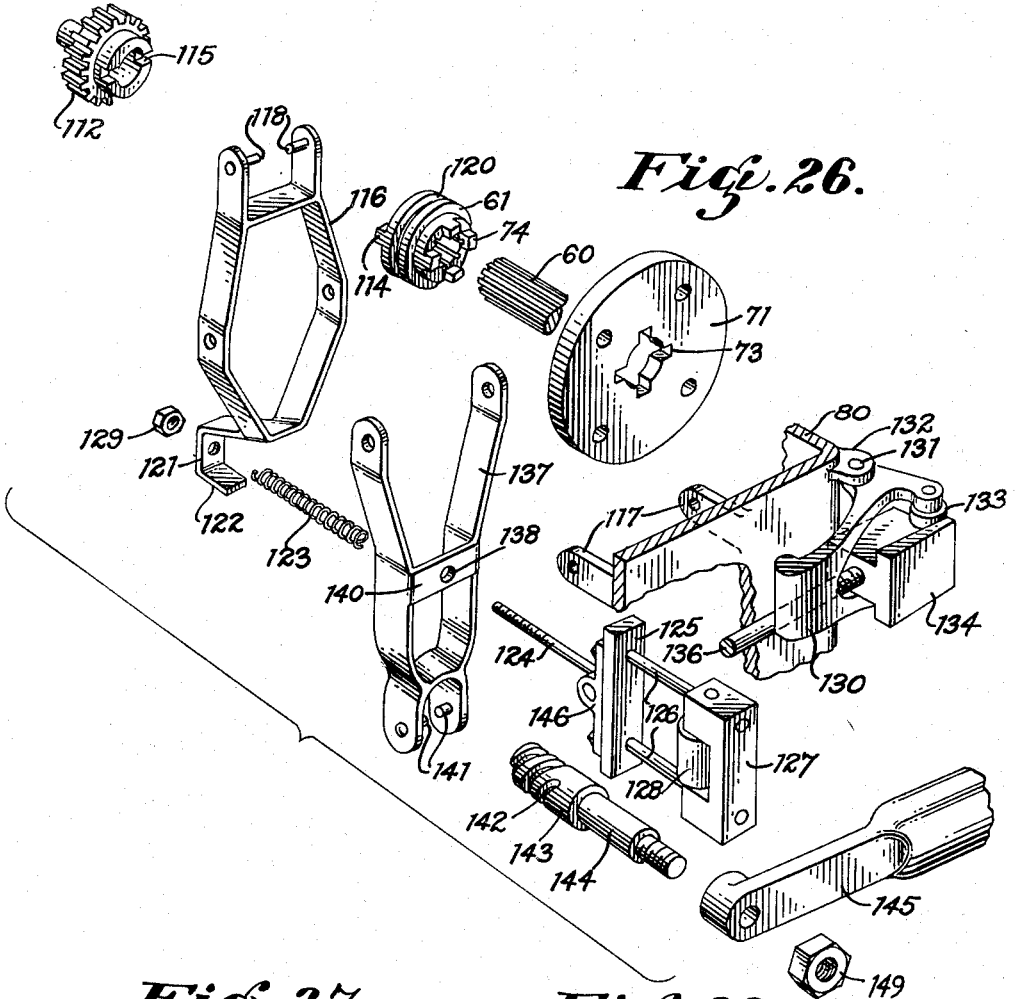
Fig. 26 is a distended perspective view of the parts comprising the shifting mechanism mounted in the rear wheel housing.
Figure 27:
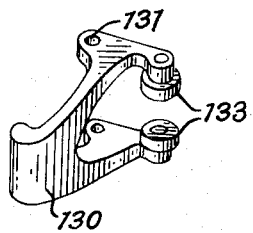
Fig. 27 is a detail perspective view of the shifting member.
Figure 28:
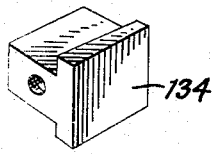
Fig. 28 is a detail perspective view of the cam shifting block.

The clutch dog 61 is shifted by means of the yoke 116, pivoted to bosses 117 on the anchor plate 80. Fig. 26 shows the parts comprising the shifting mechanism in a distended, but relative position. Shifting yoke 116 has the pins 118 which engage the slot 120 in clutch dog 61. At its other end it has an extension 121 and a stop member 122. Movement of the yoke 116 is controlled in one direction by the spring 123 and in the opposite by the toggle mounted bolt 124. Movement of the bolt 124 is effected by its attached frame 125, 126 and 127, the latter having roller 128 mounted in it. Movement of the frame, in turn, is effected by a swinging cam 130 mounted to rotate about pivot 131 on boss 132 in the anchor plate 80. The cam face 130 bears against roller 128. The cam 130 also carries rollers 133 which bear against another cam 134, which is actuated by air chamber 135 (see Figs. 16, 17, 18, 19 and 26). Fig. 17 shows cam 130 in its innermost position and Fig. 18 shows cam 130 moved outwardly by cam 134, mounted on rod 136, actuated by the air cylinder 135. In the position shown in Fig. 17 the clutch dog 61 is in engagement with retaining plate 71 (see Fig. 22). In the position shown in Fig. 18 the clutch dog 61 is in engagement with the pinion gear 112 (see Figs. 19 and 20). Movement of the shifting yoke 116 into the position shown in Figs. 18, 19 and 20 is positive, while movement of the clutch yoke into the position shown in Figs. 17 and 22 is not positive but is effected by means of the spring 123. The latter permits the male members 74 on the clutch dog 61 to move into alignment with the slots 73 in plate 71, under no more side pressure than that exerted by the spring 123.

During operation of the vehicle on the rails there is very little shock transmitted to these parts and the spring 123 is adequate to maintain the clutch dog in engagement with the retainer ring 71. On the other hand, when the vehicle is being operated on the road it is preferable to have a positive locking of the shifting yoke 116. I accomplish this by means of the forked member 137 which is also pivoted on the bosses 117 and has a hole 138 extending through its cross member 140. The toggle bolt 124 passes through hole 138. On the unpivoted end of the forked member are two inwardly extending pins 141 which engage in the threads 142 of a screw 143 mounted on shaft 144. As the shaft 144 rotates back and forth through about 180 degrees the fork 137 likewise moves in and out. Shaft 144 is caused to rotate by being rigidly attached to radius rod 145. It will be seen by reference to Figs. 17, 18 or 26 that movement of fork 137 toward the anchor plate 80 will effect a positive movement of the shifting yoke 116 due to contact of cross member 140 with boss 146 on member 125; whereas, movement of fork 137 away from anchor plate 80, under the influence of screw 143 will only serve to compress spring 123 if cams 130 and 134 are in the position shown in Fig. 18 holding the shifting yoke 116 in against anchor plate 80.

To secure a positive, controlled and limited movement of the anchor plate 80 around the hub 63 I mount radius rods 145 along the side of the vehicle. These are attached at one end to the pin 144 suitably mounted in a bearing in anchor plate 80. At the other end they are pivotally mounted at 150 to link 151, the latter being rigidly attached to the ends of shaft 152 which extends across the frame 30 and is journalled therein, at 153 and in an extension of the frame 154, 155 and 156. The shaft 152 has securely attached to it two discs 157, one being located near each of its ends. On the rim of each disc is a slot 158 adapted to receive a pin 160. This slot 158 is so positioned that when the radius rod 145 is in the position shown in Figs. 2, 3, 14, 15, 16, 19, 20, 22, and 24, the pin will engage the slot as shown in Fig. 25. The pin 160 slides in a housing 161 and has secured to it a collar 162 to transmit the pressure exerted by spring 163, which is always acting to urge the pin into the slot and to hold the pin against the face of the disc 157 whenever it is out of slot 158. In addition to its function in retaining the shaft 152 in a fixed position the pin 160 as it slides into the slot 158 also can effect a closing of the air control valve 164. Thus, whenever, the pin 160 is out of slot 158 in disc 157, the air valve 164 causes air to enter the chambers 135 and 165 through conduit 166, 167, 168 and 170.

The effect of connecting the air storage tanks 171 with the pressure chambers 135 and 165 first, is to cause the brake 105 (see Fig. 16) to grip the brake drum 87 and establish a rigid connection between the anchor plate 80 and the road wheel 38, and secondly, to shift the yoke 116 inwardly thereby engaging the clutch dog 61 with the pinion gear 112. With the parts in this condition, any rotation of axle shaft 60 will cause the brake anchor plate 80 to rotate on its bearing 81. This rotation will shift the spindle 82 from its position below axle 60 to a position above axle 60 (see Fig. 22), and the rail wheel will be in position supporting the vehicle.

From the description of the rear wheel unit thus far, it is apparent that, as the road wheel 38, carried on the spindle 82 in the pivoted anchor plate 80, is rotated about the axle housing 31 on its bearing 81, the radius rod 145 which is rigidly fastened to pin 144 will cause the latter to rotate in its bearing in the anchor plate 80.

Figure 15:
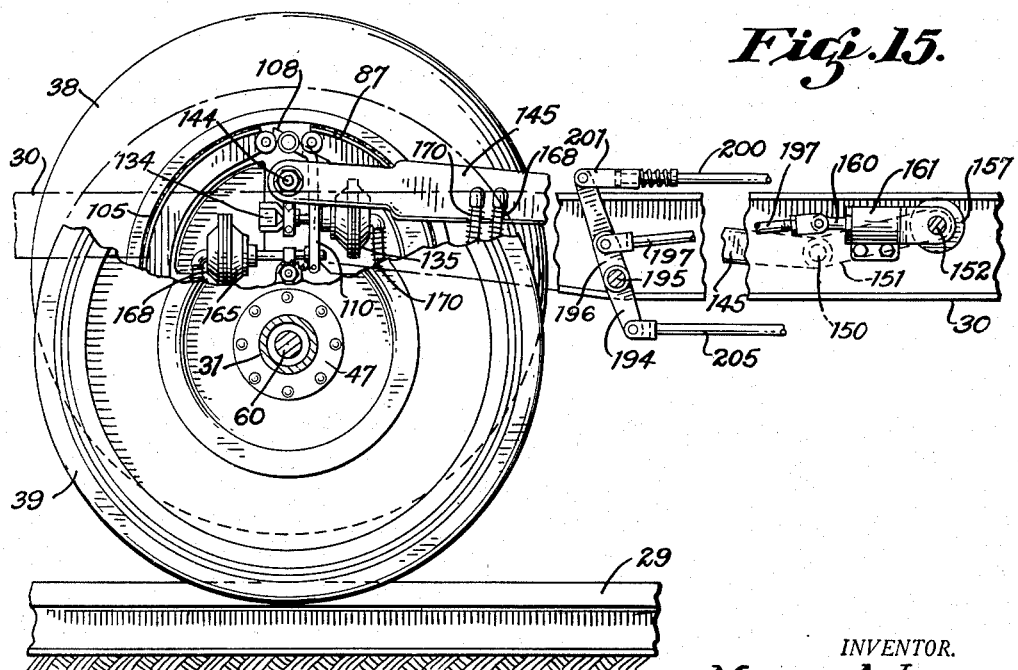
Fig. 15 is a side elevation of the same rear wheels as above, with the rail wheel in operative position.

Movement of the radius rod during the shift is forward and then backward. This will be appreciated by reference to Figs. 14 and 15. Fig. 14 shows the radius rod with the road wheel in operating position and Fig. 15 shows the radius rod with the rail wheel in operating position. In passing from the road to the rail position the radius rod, suspended on link 151, moves forward and then backward into the position shown in Fig. 15.

When the radius rod 145 is in the position shown in either Fig. 14 or Fig. 15 the discs 157 and cross rod 152 are in the position shown in Fig. 25 with the pins 160 engaging slots 158. Likewise when in operating position the radius rod 145 and link 151 assume the position shown in Fig. 2.

The radius rod 145 serves several purposes, first, as a control member for the anchor plate 80 as it pivots about the axle housing; second, as a means for rotating pin 144 so as to lock positively the clutch dog 61 in the road position; third, as a conduit for the air control line 167; and fourth, as a connecting means with the disc 157 for accomplishing automatic cessation of the shift from one position to another once it is put under way by the operator.

The power for accomplishing the movement of the anchor plate 80 from the rail position to the road position or vice versa is not supplied through the radius rod nor through the link 151, but is taken directly from the axle 60 and in this way I am able to achieve a great simplification of the structure.

When it is desired to shift from one position to the other, it is necessary that the pinion gear 112 be in operative engagement with the axle 60. This is accomplished by moving the clutch dog 61 so that male member 114 will engage the female member 115. Movement of the clutch dog 61 is effected by the shifting fork 116. Next, the air chamber 135 is actuated causing the shaft 136 to move to the right which causes cams 134 and 130 to coact and pull the shifting yoke 116 from the position shown in Fig. 17, into the position shown in Figs. 18 and 19. This can be done regardless of the position of the thread 142 on the screw 143 because of the spring 123 which is compressed as the shifting yoke 116 is pulled toward the anchor plate air chamber 135.

With the connection now established between the axle 60 and the pinion 112 and internal gear 91, any movement of axle 60 would cause the road wheels to rotate. But more is needed to effect a shift from road to rail position for under the conditions so far established the road wheel would rotate, so to accomplish instead a rotation of the anchor plate 80 about its bearings 81, 69, I provide the second air chamber 165 (see Figs. 16 and 17) which is actuated simultaneously with power chamber 135 and applies brake 105, thereby locking the brake drum 87 to the anchor plate 80. This establishes a positive non-rotating connection between the axle 60 and the tires 100 on the road wheel 38.

Any reverse rotation of the axle 60 will cause the anchor plate 80 to rotate and will effect a lowering of the rail wheel 39 (see Fig. 19) into contact with the road or rail. Further reverse rotation of the axle 60 will rotate the anchor plate 80 into the position shown in Figs. 15 and 22, where the road wheel is out of contact with the road and the radius rod 145 has assumed the position shown in Figs. 3, 15, and 22.

Rotation of the pin 144 (see Figs. 19 and 26) attached to radius rod 145 has caused the screw 142 to carry the locking member 137 into the position shown in Fig. 22, that is, away from anchor plate 80, and this has caused the spring 123 to be compressed between cross member 140 and the extension 121 of the shifting yoke 116, so that the instant the cam 130 is released, the spring 123 will cause yoke 116 to shift the clutch dog 61 out of engagement with pinion gear 112.

As soon as the connection with gear 112 is broken, clutch dog male members 74 enter the female members 73 in the retaining ring 71 and establish a driving connection between the axle 60 and the wheel hub 63 which carries the rail wheel 39. The road wheel is then in the position shown in Fig. 22 and is inactive, although free to rotate, as it would do if some obstruction adjacent the tracks were to contact tires 100.

By means of a mechanism to be described subsequently, the movement of axle 60 during this shifting operation is automatically limited to stop when the anchor plate 80 has rotated into the position last described and the pin 160 (see Fig. 25) has fallen into slot 158. Also this automatic mechanism functions to close valve 164 and release the brake 105 and shifting yoke 116.

Before passing to a description of the mechanism which effects the operation of the air chambers 135 and 165 I shall describe the braking as applied to the rear wheels.

The brakes 51 and 52 for the rail wheels are the conventional brakes found on the rear axle of a motor truck and are actuated by rotating rods 48 and 50 respectively. These are not disturbed in the application of my device on the ends of the housing and these brakes are to be used only during rail operation of the vehicle.

I have discovered that when running on the rails a more delicate control of the application of the brake is required than during road operation and for this reason I provide a separate air chamber 180 (see Fig. 4) which connects with the conventional linkage to the rear brakes on the axle housing (not shown except as in Fig. 19). These brakes are actuated by the hand valve 181 set below the steering mechanism 40 in the operator's cabin. The same valve 181 also actuates air pressure chambers 183 and 184 which apply the front wheel rail brakes. The brakes in the rear rail wheels function merely in stopping the vehicle, and do not have the dual function of the road wheel brakes mounted on the anchor plate 80 and working on drum 87.

Air is supplied to the operating chamber 180 as well as to all other power devices employed from the air storage tanks 171 in which it is compressed by the compressor 182.

As explained, the road wheel air brakes also play an important part in the shifting operation, and their control for braking and for shifting is effected through the same valve actuated however through independent levers.

When on the road, the air brakes are controlled by the conventional pedal 185 journalled in the frame member 186 and connected by rods 187 to a lever 188. This lever 188 (see Figs. 1, 3 and 29) is pivoted to a bracket 190 on the air valve 164, and comprises the arm 191 extending above and below the pivot point and also comprises the arm 192 which engages the valve control rod 193. To secure application of the foot brakes by means of pedal 185 it is only necessary that the control valve pin 193 in valve 164 should be depressed by the arm 192 on lever 188.

The connecting link 200 between the lever 188 and the lever 198 on rod 195 does not have any function in the application of the road brake by means of the foot pedal 185 and in order that the foot pedal may be applied without disturbing the position of the shifting mechanism and levers mounted on the rod 195, I provide a yoke 201 having the rod 200 floating in it with a nut 202 adjusted for the purpose to be explained later.

When the road brakes are applied by the foot lever 185 the rod 200 moves to the right (see Fig. 29) and does not effect any movement of the lever 198 due to this lost motion connection. I provide a spring 203 on the rod 200 to avoid any rattling of the parts. This spring 203 is not stiff enough to cause any movement of the lever 198 and its connected parts, when the rod 200 is moved to the right upon application of the foot brake.

When used for shifting, (see Fig. 29) the air brake valve 164 is actuated by hand lever 204, pivotally connected to rod 205, the latter being also pivotally connected to lever 194 attached also to cross-rod 195, journaled in frame 30. Lever 198, attached also to cross-rod 195, is connected to rod 200 by the lost motion device 201, for the purpose above described. When hand lever 204 is pulled back, any lost motion is taken up and through rod 200 the valve lever 191, 192 is actuated to open air valve 164.

Another important thing is accomplished when lever 204 is pulled back, namely, the retraction of the pins 160 in slots 158 of discs 157. With these pins retracted the radius links 151, discs 157, and attached shaft 152 are free to oscillate with the radius rods for the shifting operation. When this movement begins, the pins 160 can ride on the face of discs 157, and the linkage 160, 197, 196, 198, 201, 200 and 191 is so adjusted that air valve 164 will be held open in this manner. When the shift is completed and discs 157 have returned to normal position, pins 160 fall into slots 158 (see Fig. 25) and through the above linkage the air valve 164 closes automatically. The operator by pulling back on hand lever 204, can prevent pins 160 from falling into slots 158 and hold valve 164 open, although this should be done only at the start of a shifting operation, and not at the finish.

With the road wheel drive thus far described and shown, for instance in Fig. 19, the drive is through the axle 60 and the pinion gear 112, which drives to the internal ring gear 91. This gives a considerable reduction in speed of the road wheel and the engine, compared to the reduction in drive between the engine and the rail wheel. In most installations, I prefer to provide means which will give an approximately equal ratio between the axle 60 and the rail wheels when they are in operation and between the axle 60 and the road wheels when the latter are in operation. I accomplish this by means of the construction shown in Figs. 30, 31 and 32.

Fig. 32 is in most particulars like Fig. 19, except for the provision of the gear train drive between the pinion 112 and the ring pinion on the hub of the road wheel, which ring pinion replaces the internal ring gear 91 on the construction shown in Fig. 19.

In Fig. 32, the axle 60 extends out through the end of housing 31 and has splined on its outer end a clutch dog 61. The axle 60 I have illustrated is of the full-floating type and at its inner end (not shown) it projects into one side of the differential mechanism (not shown). It is through this axle 60 that the driving torque is carried to both the road wheel 38 and the rail wheel 39. It is also through this axle 60 that the shift of the rear wheels is driven.

The rail wheel 39 is bolted to flange 62 on hub 63. This same flange also carries the brake drum 53. The hub 63 is mounted on roller bearings 64 and 65 which are in turn supported on the end of the axle housing 31. A retaining nut 66 holds the outer bearing 65 in position. Roller bearing 64 is retained in position by the shoulder 67. A retainer plate 71 is rigidly secured over the end of the hub 63 by cap screws 72, and has an opening in the center provided with notches 73 to be engaged by the clutch dog 61. When driving through the axle 60 to the rail wheel 39, power is transmitted from the clutch dog 61, splined on the axle, to this retainer plate 71 and thence to the hub 63. The projections 74 on the clutch dog 61 slidably engage with the notches 73 in the retaining plate 71. Figs. 3, 15, 22 and 23 show the parts in position with the drive through the rail wheels.

The road wheels 38 are carried by the same axle housing 31 by means of the following mechanism. A spindle anchor plate 80 is provided with a bearing recess 81 into which fits the roller bearings 89. These are fitted on the inside to the hub 63 in such a way that the anchor plate 80 can be rotated around the axle 60 and housing 31. Thus the spindle shaft 82, held in the plate 80 by nut 83, can be shifted to a position above or below the main axle shaft 60 by rotation of the plate 80. In Fig. 32 it is shown in a position below axle 60. The retaining plate 71 serves also as a retaining member to hold the anchor plate 80 on the hub 63, since it presses against the inner race of the outer roller bearing 89.

In or on the anchor plate 80 is mounted the mechanism required for driving the road wheels 38. On the spindle 82 are the roller bearings 84 and 85 which fit in the hub 86 of the road wheel 38. Integral with the hub 86 is the brake drum 87 having the stepped portion 88 to provide space for the drive mechanism. Fitted in the bottom of the brake drum portion 87 is an oil retainer 93 having a leather flange 94 spring pressed against a flange 95 on the anchor plate 80. This grease retainer serves to confine the grease contained in the housing formed by the anchor plate 80 and the brake drum housing 88.

The hub 86 is retained on the spindle 82 by means of the usual nut 96.

The road wheels 38 comprise the tires 100 with tubes 99, rims 101 and web portions 102, the latter being bolted to the wheel hub 86 by means of the nuts 103.

A brake anchor and dust plate 104 is attached to the anchor plate 80. In this plate 104 (see Fig. 16) is mounted the brake mechanism for the road wheel 38. This mechanism comprises the brake shoes 105, adjustable links 106, retraction springs 107 and actuating cams 108 carried on the lever 110. 111 is the conventional brake adjustment cam and is carried by plate 104.

The drive mechanism to the road wheel 38 comprises the pinion 112, idler gears 98, and ring pinion gear 97. Gear 97 is rigidly secured to road wheel hub 86 and is in constant mesh with idler gears 98, which in turn are always in mesh with pinion 112.

Pinion gear 112 is loosely mounted on the outer end of axle 60, the latter being supported at its outer end in a roller bearing 109 set in bracket 113. The pinion 112 drives gears 98 and 97 only when the clutch dog 61 is shifted to the left (see Fig. 32) so that the lugs 114 nest in the female member 115 on the face of clutch dog 61. In this position the male member 74 is disengaged from the female member 73 in the retaining plate 71 so that the rail wheel is not driven. The clutch dog 61 is arranged so that it disengages one driven member before engaging the other driven member.

Figs. 30 and 31 show the idler gear 98 mounted in bracket 113, bolted to anchor plate 80 by cap screws 139. The idlers 98 are loosely mounted on short shafts 147, journaled in bracket 113 and its extension member 148.

Except for the change in the drive to the road wheels, just described, and for the mounting of the anchor plate 80 on roller bearings 89, the structure is like the one in Fig. 19 and the shift from road to rail, and vice versa is accomplished in an identical manner and by the identical means (see Fig. 26) already described. By using the ring pinion gear 97 on the hub 86 and the idlers 98, I can provide a construction by which I can secure a variation in gear ratios between the shaft 60 and road wheel 38. As shown in Figs. 30, 31, and 32, the ratio is one to one, but by changing the size of gears 112 and 97 (necessitating a change in the positioning of idlers 98 in their frame 113) I can secure a variety of ratios.

The front end

While it is possible, and under certain circumstances feasible, to employ for the front end of the roadrail vehicle a device similar to that used on the rear end, I prefer to employ a small truck 300 having the small wheels 301 mounted in suitable roller bearings 302 (see Fig. 7) on the ends of axles 303. The axles in turn are mounted in the enlarged ends of longitudinal frame members 304. The axles 303 serve as the cross members.

The ends of the longitudinal frame members 304 are enlarged to form the flangelike member 305 on which the front wheel brake shoes 306 are anchored. I have shown a cable operated brake although any other form might be used. The brake comprises the shoes 306, the adjusting mechanism 307, the actuating cam 308 and the cable 310 carried in the flexible housing 311 which is fastened to the housing flange 305 at 312.

The brakes are actuated by means of power chambers 183, 184 secured to the side frame members 304. The plunger (not shown) in the power chamber is attached to shaft 314 and is connected to the link 315 to which are connected the brake actuating cables 310. A spring 316 serves to retract the brakes when the power chamber lets go.

Another important feature of the enlarged ends 305 of the longitudinal side members is the means provided at 317 for the mounting of the linkage by which the axles 303 and wheels 301 are raised and lowered. The housing 317 is formed with its inside walls 318 spaced to form guide plates for the shackles 320. Shackle bolt 321 secures one end of the shackle to the wheel frame member 304 and shackle bolt 322 secures the other end of the shackle to link 323. By fitting the shackles 320 to fill the space between the side walls 318 I provide a device which is rigid and has a minimum of fore and aft play.

The connection between the wheel truck just described and the road axle 34 of the vehicle steering spindles 37 at each end, is accomplished by means of an intermediate frame member generally indicated at 330. This intermediate frame member comprises the bolster member 331 and the housing 333 which tie together the ends of the longitudinal members 332. The bolster member 331 has roller bearing 334 set in a recess on its upper side (see Fig. 8), and an opening in its center to receive a king pin 335 which projects downwardly from the plate 336 which is carried by the vehicle road axle 34. It is fastened to the latter by means of a plate 337 and bolts 338. On the under side of the axle plate member 336 I prefer to mount rollers 340 which engage a suitable track 341 formed in the upper side of the bolster member 331, concentric with the roller bearing 334. The king pin 335 pivotally connects the rail truck frame to the vehicle road axle 34.

The housings 333 carried at each end of the longitudinal members 332 are identical and have extending upwardly a rib 343 which serves as a bearing member for one end of the links 323. These are pivotally attached by bolts 344 and permit the links 323 to move between the positions shown in Figs. 11 and 12.

The raising and lowering of the rail truck and wheels is accomplished by means of the links 323 which have extensions 345 formed near their middle on the upper side. Links 346 are pivotally attached at one end to these projections and are pivotally secured at 347 to the female screw members 348. As these members 348 are pulled into the housing 333 they cause a lowering of the rail truck and wheels onto the rails 29, and their continued movement effects a lifting of the road wheels 38 from contact with the road. In other words, they cause the rail truck to move from the position shown in Fig. 11 to the position shown in Fig. 12. If it is desired to change the front end of the vehicle from rail to road position, that is from the position shown in Fig. 12 to the position shown in Fig. 11, the screw members 348 are caused to move outwardly in end housings 333. There is one of these housings on each end of the side intermediate frame members 332.

The in and out movement of the female screw members 348 is effected by means of the male screw members 351 having a worm pinion 352 fitted in the enlarged central portion of the housing 333. The sides of pinion 352 bear against the walls of this recess and provide whatever support is needed for the thrust of the screws 351. This thrust is reduced to a minimum by having the screw threads on opposite sides of the pinion 352, a right hand and a left hand thread.

Movement of the worm pinion 352 is effected by means of a worm gear 353 suitably mounted in the housing 333 on the end of shaft 354. While I have shown this worm gear on the underside of the pinion 352 I prefer to mount it on the upper side when additional road clearance is desirable. As shown, the shaft 354 is made up of three parts, the end sections to which the worms 353 are secured and a center section to which the pinion gear 355 is secured. The three parts are connected together by couplings 356.

The pinion gear 355 is mounted in the gear housing 357 which is fastened by means of brackets 358 to the bolster 331. In the housing 357 is another shaft 360 to which is rigidly secured a pinion 361 meshing with pinion 355. Movement of the truck from the rail to the road position and vice versa is effected by rotation of shaft 360. I show this in Fig. 13 as being driven from a shaft 362 through toggle joints 363 and jack shaft 364. The short shaft 362 connects up with a suitable source of power shown in Fig. 3 as a chain drive 367 from a power take-off shaft 365, on the end of the vehicle transmission 366. To care for any breakdown in this power drive connection to the shaft 360, I have squared its end at 368 to receive a suitable crank which would be inserted from the front end of the truck.

By forming the longitudinal frame member 304 with the flange projection 305 extending outwardly I provide a recess in which the road wheel 38 can move on its spindle mounting 326.

The raising or lowering of the front truck mechanism is controlled from the operator's cab where there is positioned a control lever 368 for connecting and disconnecting the power take-off shaft 365 with the engine. Rotation of this shaft in one direction will raise the truck for road operation, whereas rotation in the opposite direction will lower the truck for rail operation.

As a guide to the operator in the raising and lowering of the front truck I provide a tell-tale mechanism 370 mounted in the cab and having a hand (not shown), which in one position denotes "up" and in the other denotes "down" for the rail truck. It is operated by means of a cable passing inside the flexible tubing 371 which is connected to the raising and lowering mechanism at 372. A similar tell-tale 380 is arranged to show the position of the rear wheel units and comprises the flexible tubing 381, with a cable inside connecting the instrument dial to cross-shaft 152, at 382. In this case the indicator hand oscillates over and back when signalling a shift from road wheel to rail wheel, or vice versa.

Operation

The following description of operation of my device will show the interrelation of the parts and the sequence of their functioning.

Arranged within reach of the operator are the controls, and instruments comprising among other things the conventional engine clutch lever (not shown); the usual engine gear shift lever (not shown); the conventional foot brake pedal 185, the hand valve 181 on the steering column 383; the power-take-off control lever 368 for the front end; and the rear wheel shifting release lever 204.

I shall start with the parts in position for road operation and shall assume that the road rail vehicle is being driven under power along a road.

The front rail truck 300 is held above the road (see Figs. 2, 5, 11, 13) and the rear rail wheels 39 are likewise held above the road (see Figs. 2, 14, 19, 20, 21, and 32).

The truck engine 384 is transmitting power through the usual means to the rear axle 60, from whence the power is being transmitted to the rear road wheel 38 by means of pinion gear 112, and internal ring gear 91 (see Figs. 19 and 20). With the modification shown in Figs. 30, 31, and 32 the rear wheel receives its power from axle 60, through pinion gear 112, idler gears 98 and ring pinion gear 97, mounted on the hub 86 of the rear road wheel 38. The advantage of this construction over the internal gear drive is that the road wheels 38 will turn about the same speed as the rail wheels can be turned, and therefore give equal performance on road or rail.

The front road wheel brakes are conventional and are actuated by power chamber 385 (see Fig. 4). The rear road wheel brakes 105 (Figs. 16 and 19) are actuated by power chambers 165, each mounted on the anchor plates 80. Power chambers 385, and 165 receive air pressure from storage tanks 171, whenever valve 164 is opened by depressing foot pedal 185. My device effects no change in road operation, over the conventional motor truck.

No change in road operating conditions results, but it should be noticed that power chambers 135, also mounted on the anchor plates 80 are actuated each time air chambers 165 apply the brakes. Power chamber 135 when actuated, causes cam levers 130 and 134 to move into the position shown in Figs. 18 and 19. This movement however makes no change in the position of shifting frame 125, 126, 127, as it is already being held in the position shown, by the cross member 140 on locking member 137, the latter being positively positioned by screw threads 142.

Now let us assume the driver desires to cease road operation and to take up rail operation. The vehicle is driven into position with the center line of the truck coinciding with the center line of the rails. The operator does not have to leave the cab nor does he require the assistance of anyone on the ground to complete the changeover from road to rail or vice versa.

The better practice is to lower the front rail wheels onto the rails before lowering the rear rail wheels; and on the change from rail to road operation the better practice is to raise the front rail wheels after the rear rail wheels have been lifted. In other words, have the front rail wheels down during each changeover operation. The reason for this is that the shift of the rear wheels causes a longitudinal movement of the truck along the ground. To accomplish the shift of the rear wheels the road wheel brakes must be locked, and as the front and rear road brakes operate from one valve 164 the front wheels would be locked and would have to slide over the ground; whereas, if the front rail wheels are always down during the changeover the necessary longitudinal movement will be had without any resistance from brakes on the front rail wheels (operated by hand valve 181).

With the truck in position; the engine clutch is disengaged and the power take-off lever 368 is moved forward and the clutch is let in. This transmits power from the engine 384 through chain 367, shaft 362, toggle 363, shaft 364, 360 to gears 361, 355, to shaft 354, worm 353, worm pinion 352 and male screw member 351, causing female screw members 348 to move inward, pulling links 346, 323 downwardly and shifting front truck 300 from the position shown in Fig. 11 to the one in Fig. 12 with the front rail wheels 301 on the rails 29 and the front road wheels 38 lifted clear of the road. The operator is advised of the completion and progress of the shift by the indicator hand in instrument 370, the latter being actuated by a cable in tube 371, fastened to the toggle link bolt at 372 (Fig. 9). When the indicator hand reads "Rail down" the engine clutch is disengaged and power take-off lever 368 is shifted into neutral position.

The remaining operation required is to bring the rear rail wheels 39 down onto the rails 29; that is, from the position shown in Figs. 1, 2, 4, 14, 16, 19, 20, 21, 30 and 32 into the position shown in Figs. 3, 15, 22 and 23.

The operator disengages the engine clutch and pulls back on lever 204 which acts through links and levers 205, 194, 198, 200, 191, and 192 to open air valve 164 and through links and levers 205, 194, 196, 197, to pull pins 160 out of slots 158 in discs 157. With pins 160 pulled, shaft 152 can oscillate. When air valve 164 opens it admits air to power chambers 165 and 135; 165 applying the brake 105 through lever 110, thereby locking rear wheel 38 to anchor plate 80; and 135 moving cam levers 130 and 134 into the position shown in Figs. 18 and 19 to hold the shifting frame 125, 126, and 127 in toward the anchor plate until the shift to the rail wheel is completed. This is important because the torque from axle 60 to road wheel 38 and anchor plate 80 is through the clutch dog 61, (splined on axle 60 and held in engagement with pinion gear 112 by yoke 116 controlled by shifting frame 125, 126 and 127), then to internal ring gear 91 bolted to road wheel 38. (In Fig. 32 the torque is through clutch dog 61, then to ring pinion gear 97, through idlers 98.)

When the above conditions are established, namely, with the axle 60 locked to road wheel 38 and anchor plate 80, and with the radius rod links 151 on lock shaft 152 unlocked, the operator places the engine gear shift lever (not shown) in "reverse" and allows the clutch to remain engaged until the shift into the position shown in Figs. 3, 15, 22 and 23 is effected. The instrument 380 in the operator's cab advises when this has taken place as the operator can watch the hand move over and back to the starting point. This indicates to him that the road wheel 38 and anchor plate 80 have been moved from the position in Fig. 19 to the one in Fig. 22.

There is positive control of the extent of rotation of anchor plate 80 around housing 31, obtained by having radius rod 145, fastened at one end to anchor plate 80 by the nut 149 and at its other end pivoted to a link 151, rigidly mounted on the end of lock shaft 152. As the anchor plate 80 rotates in going from one position to the other, the radius rod swings forward and backward, together with link 151 (see dotted line on Fig. 29 which indicates limit of forward movement).

An additional function performed by the radius rods 145 relates to the automatic means for closing valve 164 upon completion of the shift. When the operator pulls back lever 204, it is necessary for him to hold it only until discs 157 have been rotated, by radius rods 145 and links 151, sufficiently to put slots 158 out of alignment with pins 160. From this point on, control of valve 164 is taken up by links and levers 160, 197, 196, 195, 198, 200, 191 and 193, so that when the discs 157 return to their starting point and pins 160 fall into slots 158, the above linkage effects a closing of valve 164. With valve 164 closed, the power chambers 165 and 135 return to inactive position, releasing the brakes and the lock effected through them. At this instant the operator should release the engine clutch, but if he does not do so, no harm can come as the axle 60 will simply rotate road wheels 38 about spindle 82 which of course are off the road. I provide the rubber bumpers 159 on links 151 to soften the shock to the radius rod mechanism as it reaches the shifted position.

During the shift from road to rail position the pins 144 were rotated by radius rods 145 so that threads 142 engaged by pins 141 in locking member 137, moved the latter away from anchor plate 80 (see Fig. 22). The power chamber 135, however was holding the shifting frame 125, 126 and 127, and shifting yoke 116 tight against anchor plate 80 so the only effect of moving locking member 137 out was to compress spring 123 between cross member 140 and yoke member 121. In other words, at this point it is as if the parts are exactly as shown in Fig. 18 except that spring 123 has been compressed by cross member 140 moving away from 146. Thus, as soon as valve 164 closes, shifting frame 125, 126, 127 will be moved by spring 123 into the position shown in Fig. 17, accomplishing thereby the movement of shifting yoke 116 and clutch dog 61 from the position shown in Fig. 20 to the position shown in Fig. 22.

This spring shifting of the clutch yoke 116 and clutch dog 61 at the closing of valve 164, upon completion of the movement of anchor plate 80, establishes the rear wheel rail drive in operative relation. The operator then disengages the engine clutch and moves the engine gear shift lever into "neutral". The vehicle is now ready for operation on its rail wheels.

The drive to the rail wheel 39 is then through axle 60, clutch-dog 61, retaining plate 71 bolted to rail wheel hub 63. The braking of the rail wheels 39 must be delicately controlled and I have shown a sensitive hand control valve 181 mounted on steering wheel column 383 in the driver's cab. The road wheels 38 are all out of contact with the road and therefore any accidental operation of foot pedal lever 185, controlling them will have no effect on operation in the rail position.

The rear rail wheel brakes 51 and 52 are the conventional brakes on the rear axle of the truck and are applied by a power chamber 180 (see Fig. 4). The front rail wheel brakes 306 are likewise applied through power chambers 183 and 184 mounted in the front truck frame.

In both the road wheel brakes and rail wheel brakes suitable provision is made at 386 and 387 for conducting air pressure to trailers attached to this main truck unit.

While on the rails, further operation of the roadrail vehicle, is standard to operation on the road, except for using the hand valve 181 to apply the brakes.

Now let us assume the operator has reached a point where it is desired to cease rail operation and take up road operation. He will select a place on the rails with suitable smooth road adjacent.

The first operation on the rail to road shift, assuming the vehicle has been brought to a standstill, is for the operator to lower the rear road wheels and thereby raise the rail wheels. We have seen thus far, that it is essential for clutch dog 61 to be in engagement with pinion gear 112 whenever it is desired to move anchor plate 80.

The operator pulls back on lever 204 thereby opening valve 164. This does several things; power chamber 135 through cams 130 and 134 moves shifting frame 125, 126, 127 which pulls shifting yoke 116 in toward anchor plate 80, (if lugs 114 on clutch dog 61 do not happen to align with notches 115 in pinion 112 no damage is done the parts as only the air pressure is urging them together) and shifts clutch dog 61 into engagement with pinion gear 112; and compresses spring 123. Power chamber 165 applies brakes 105 in drums 87, thereby locking road wheels 38 to anchor plates 80. Pulling on lever 204 also effected a pulling of locking pins 160, so the radius rod linkage is freed for movement.

The operator next disengages the engine clutch and puts the engine transmission shift lever into a "forward" position. Forward movement is necessary in the rail to road shift because the radius rods 145 are in the position shown in Fig. 15 and the only way they can be moved to the position shown in Fig. 14 is by rotating axle 60 in a forward direction.

The operator allows the clutch to engage and disengages it when the hand on instrument 380 has oscillated over and back to its starting point. After experience, an operator can time the disengaging of the engine clutch to coincide with the re-engagement of pins 160 in slots 158 (the latter permits valve 164 to close, through links and levers 197, 196, 195, 198, 200, 191, and 193. If he should leave the engine clutch engaged after the time that valve 164 closes, the effect will be to drive the truck forward, because the rear road wheel brakes were released when valve 164 closed.

During this shift, the effect of the partial rotation of anchor plate 80 and the pin 144 to which radius rod 145 is rigidly attached, has been to move pins 141 in screw thread 142 and thereby pull locking member 137 into the position shown in Figs. 19 and 20. The importance of this is that the locking member 137 and the cross member 140 have positively locked toggle bolt 124 against anchor plate 80, and since shifting yoke member 121 is attached to bolt 124 by nut 129 it is locked against movement and clutch dog 61 can not be jarred out of engagement with pinion gear 112. The operator then moves the engine gear shift lever to "neutral" position.

He now turns attention to raising the front rail truck 300, which he does by disengaging the engine clutch and shifting the power take-off control lever 368 backward and the clutch is let in. He watches the hand on instrument 370 and when it points to the mark "Rail Up" the engine clutch is disengaged and power take-off lever 368 is shifted into neutral position. The vehicle is now ready for road operation.

While I have shown and described one form of my invention, it is obvious that it can be embodied in other forms which will in substance be the full equivalent. Likewise, choice of alternatives in the manufacturing design of certain parts exists, therefore, I do not intend by the above description to limit myself in the following claims to the one form of device shown and described.

What I claim as my invention is:

1. In a vehicle adapted for road and rail operation having a frame, an axle housing, driving axles therein, and separate road and rail wheels, the combination of eccentric anchor plates rotatably mounted on said housing, means for mounting one each of a matched pair of said wheels on said plates, means for mounting the other pair of wheels concentric with said driving axles, means for selectively driving one or the other of said pair of wheels, depending upon which pair is in lowered tractive position and means attached between said frame and said anchor plates for controlling movement of the latter about said housing.

2. In a vehicle adapted for road and rail operation having a frame, an axle housing, driving axles therein, and separate road and rail wheels, the combination of eccentric anchor plates rotatably mounted on said housing, means for mounting one each of a matched pair of said wheels on said plates, means for mounting the other pair of wheels concentric with said driving axles, means for selectively driving one or the other of said pair of wheels, depending upon which pair is in lowered tractive position and a radius link attached between said frame and said anchor plates for controlling movement of the latter about said housing.

3. In a vehicle adapted for road and rail operation having a frame, an axle housing, driving axles therein, separate road and rail wheels, and brakes for said wheels, the combination of eccentric anchor plates each carrying one of said wheels, a gear on the hub of said wheels, a pinion gear meshing therewith driven by said driving axles, means for mounting the other wheels on said axle housing, and means for setting the brakes on said first-named wheels and for meshing said gears whereby rotation of said driving axles will cause rotation of said anchor plates.

4. In a vehicle adapted for road and rail operation having a frame, an axle housing, driving axles therein, separate road and rail wheels, and brakes for said wheels, the combination of eccentric anchor plates each carrying one of said wheels, a gear on the hub of said wheels, a pinion gear meshing therewith driven by said driving axles, means for mounting the other wheels on said axle housing, means for setting the brakes on said first-named wheels and for meshing said gears whereby rotation of said driving axles will cause rotation of said anchor plates, and means attached to said frame and said anchor plates for limiting rotation of the latter.

5. In a vehicle adapted for road and rail operation having a frame, an axle housing, driving axles therein, separate road and rail wheels and brakes for said wheels, the combination of eccentric anchor plates each carrying one of said wheels, a gear on the hub of said wheels, a pinion gear meshing therewith driven by said driving axles, means for mounting the other wheels on said axle housing, means for setting the brakes on said first-named wheels and for meshing said gears whereby rotation of said driving axles will cause rotation of said anchor plates, means attached to said frame and said anchor plates for limiting rotation of the latter, and shift control means actuated by said last-named means to release said brakes upon completion of rotation of said anchor plates.

6. In a vehicle adapted for road and rail operation having a frame, an axle housing, driving axles therein, separate road and rail wheels, and brakes for said wheels, the combination of eccentric anchor plates each carrying one of said wheels, a gear on the hub of said wheels, a pinion gear meshing therewith driven by said driving axles, means for mounting the other wheels on said axle housing, means for setting the brakes on said first-named wheels and for meshing said gears whereby rotation of said driving axles will cause rotation of said anchor plates, and means for automatically effecting the setting of said brakes and meshing of said gears whenever a shift from road wheel to rail wheel or vice versa is initiated.

7. In a vehicle adapted for road and rail operation having a frame, an axle housing, driving axles therein, separate road and rail wheels, and brakes for said wheels, the combination of eccentric anchor plates each carrying one of said wheels, a gear on the hub of said wheels, a pinion gear meshing therewith driven by said driving axles, means for mounting the other wheels on said axle housing, means for setting the brakes on said first-named wheels and for meshing said gears whereby rotation of said driving axles will cause rotation of said anchor plates, said brakes also functioning as such when said vehicle is being operated on said first-named wheels.

8. In a vehicle adapted for road and rail operation having a frame, an axle housing, driving axles therein, separate road and rail wheels, and means for mounting one set of said wheels directly on said housing, the combination of an eccentric anchor plate on each end of said housing, each plate carrying one of said other set of wheels, clutch means for connecting said driving axles to said last-named wheels, and a second clutch means for connecting said last named wheels to said anchor plates whereby the driving torque through said axles may be employed to rotate said anchor plates.

9. In a vehicle adapted for road and rail operation having a frame, an axle housing, driving axles therein, separate road and rail wheels, and means for mounting one set of said wheels directly on said housing, the combination of an eccentric anchor plate on each end of said housing, each plate carrying one of said other set of wheels, clutch means for connecting said driving axles to said last-named wheels, a second clutch means for connecting said last-named wheels to said anchor plates, and means mounted in said anchor plates to effect the engagement of said clutches whereby the driving torque through said axles may be employed to rotate said anchor plates.

10. In a vehicle adapted for road and rail operation having a frame, an axle housing, driving axles therein, separate road and rail wheels, and means for mounting one set of said wheels directly on said housing, the combination of an eccentric anchor plate on each end of said housing, each plate carrying one of said other set of wheels, clutch means for connecting said driving axles to said last-named wheels, a second clutch means for connecting said last-named wheels to said anchor plates, and pneumatically actuated means mounted in said anchor plates to effect the engagement of said clutches, whereby the employment of levers and rods is obviated and fluid pressure is conducted thereto through flexible conduits.

11. In an accessory adapted for attachment to each end of an axle housing supporting a vehicle frame, having a wheel, and means for mounting said wheel for rotation on said housing, the combination of an anchor plate having a stub shaft thereon offset from said housing and a bearing surface spaced therefrom, a wheel fitted to said stub shaft, means fitting said bearing surface for mounting said anchor plate for rotation around said housing, and a connecting member pivoted to said anchor plate and connected to oscillate in said vehicle frame whereby the extent of rotation of said anchor plate is limited so that in one extreme position the first-named wheel only is in contact with the roadbed and in the other extreme position only the wheel fitted on said stub shaft is in contact with the roadbed.

12. In an accessory adapted for attachment to each end of an axle housing supporting a vehicle frame, and having a driving axle therein, a wheel concentric therewith, and means for mounting said wheel for rotation on said housing, the combination of an anchor plate having a stub shaft thereon and a bearing surface spaced therefrom, a wheel fitted to said stub shaft, means fitting said bearing surface for mounting said anchor plate for rotation around said housing, clutch means for connecting said driving axle either to said first-named wheel or to said wheel on said stub shaft, a connecting member pivoted to said anchor plate and connected to oscillate in said vehicle frame whereby the extent of rotation of said anchor plate is limited so that in one extreme position the first named wheel only is in contact with the roadbed and in the other extreme position only the wheel fitted on said stub shaft is in contact with the roadbed, and means operated by said connecting member which assure the proper clutch engagement for the operation of each wheel.

13. In an accessory adapted to convert a road vehicle into a combination vehicle having road and rail wheels comprising an internal bearing surface projecting from and integral with the hub of the vehicle wheel, an anchor plate fitted to said bearing to rotate about said hub, a stub axle shaft carried in said plate, a wheel fitted to rotate on said shaft, means for rotating said wheel by the same driving axle that rotates the vehicle wheel, and means for locking said wheel to said anchor plate when said wheel is connected to said driving axle, whereby rotation of the latter will effect rotation of said anchor plate.

14. In a road rail vehicle of the type having both a road and a rail wheel supported on spaced centers on each end of the axle housing, one rotating about said housing and the other about a pivot spaced vertically therefrom and drive shafts in said housing, the combination of clutch means splined on each of said drive shafts, clutch actuating means connected therewith, and means for shifting said clutch into engagement with the wheel mounted on said spaced pivot.

15. In a road rail vehicle of the type having both a road and a rail wheel supported on spaced centers on each end of the axle housing, one rotating about said housing and the other about a pivot spaced vertically therefrom and drive shafts in said housing, the combination of clutch means splined on each of said drive shafts, clutch actuating means connected therewith, and means for positively locking said clutch in driving engagement with the road wheel when it is in operative position on the road.

16. In a vehicle adapted for road and rail operation having a frame, an axle housing, driving axles therein, separate road and rail wheels, anchor plates mounted for rotation on each end of said housing, a stub shaft on each of said plates carrying one of said wheels, means for mounting the other of said wheels on said housing, clutch means for selectively connecting said driving axles to one or the other set of wheels, and means for positively locking said clutch in engagement to connect the road wheels whenever the latter are supporting the vehicle on the road.

17. In a vehicle adapted for road and rail operation having a frame, an axle housing, driving axles therein, separate road and rail wheels, anchor plates mounted for rotation on each end of said housing, control means pivoted to each of said anchor plates and connected to reciprocate in said frame, a stub shaft on each of said plates carrying one of said wheels, means for mounting the other of said wheels on said housing, clutch means for selectively connecting said driving axles to one or the other set of wheels, and means actuated by said control means for positively locking said clutch in engagement to connect the road wheels whenever the latter are supporting the vehicle on the road.

18. An accessory adapted to convert a road vehicle into a combination vehicle having road and rail supporting wheels comprising a bearing flange to be secured to the wheel hub of the vehicle, a supporting wheel secured upon said hub, an anchor plate rotatably mounted upon said bearing, a stub shaft secured in said anchor plate offset radially from the aforesaid hub, a second supporting wheel rotatably mounted on said stub shaft, and a control link pivoted to said anchor plate and reciprocally connected to the frame of said vehicle, said link being adapted to position said anchor plate with the second supporting wheel in contact with the roadbed or with said wheel lifted out of such contact and leaving the vehicle supported on the first-named wheel.

19. An accessory adapted to convert a road vehicle into a combination vehicle having road and rail supporting wheels comprising a bearing flange to be secured to the wheel hub of the vehicle, a supporting wheel secured upon said hub, an anchor plate rotatably mounted upon said bearing, a stub shaft secured in said anchor plate, a second supporting wheel rotatably mounted on said stub shaft, a control link pivoted to said anchor plate and reciprocally connected to the frame of said vehicle, said link being adapted to position said anchor plate with the second supporting wheel in contact with the road bed or with said wheel lifted out of such contact and leaving the vehicle supported on the first-named wheel, a shiftable clutch splined on the driving axle of the vehicle, a mating clutch member secured to the aforesaid wheel hub of the vehicle, a pinion gear loosely mounted on said driving axle, having a mating clutch member, a mating gear rigidly secured to said second supporting wheel, clutch shifting means pivoted to said anchor plate, clutch shifter actuating means mounted in said anchor plate, brake shoes mounted on said anchor plate, brake actuating means mounted in said anchor plate, and control means connected to said clutch shifter and brake actuating means to effect actuation thereof, said actuation effecting a driving connection between said driving axle, said pinion gear and said second supporting wheel, and between said second supporting wheel and said anchor plate, when it is desired to shift said anchor plate and the supporting wheels from road to rail position or vice versa.

MILTON A. LUCE.